Patented Oct. 14, 1947

2,429,092

UNITED STATES PATENT OFFICE 2,429,092

INSECTICIDAL COMPOSITION

Stephen C. Dorman, Berkeley, Calif., assignor to Shell Development Company, San Francisco, Calif., a corporation of Delaware No Drawing. Application August 14, 1944, Serial No. 549,490

13 Claims. (Cl. 167—24)

This invention relates to new and novel compounds which are particularly suitable for killing noxious insects and the like. More specifically, the invention is concerned with insecticidal compositions containing N-substituted para-diamino carbocyclic ring compounds.

Among the best known toxicants used in insecticidal compositions, particularly in household insecticides, are pyrethrum and rotenone. These are both derived from plants grown in foreign countries and are therefore expensive and not always obtainable in desired quantities. Thus, many organic compounds which are more readily available in this country have been proposed as toxicants for insecticidal compositions. However, although many of these proposed compounds are relatively efficient for momentarily incapacitating insects, they are relatively inefficient for killing insects. In addition to the desirability of high toxic action, for use in insecticides, particularly in household insecticides, the compounds must be light-stable, compatible with light paraffinic mineral oils, such as kerosene, and free from injurious effect and offensive odor to human beings and tendency to stain walls, fabrics, etc.

It is an object of the present invention to provide an insecticidal composition which is highly toxic to insects but of low toxicity to man and other warm-blooded animals. Another object is to provide new insecticidal compositions which can be prepared from readily available domestic and inexpensive materials. A further object is to provide an improved insecticidal composition containing a fast-acting synthetic toxicant. A still further object of this invention is to provide an activator for toxic plant extracts, such as pyrethrum and derris resin or rotenone, in insecticidal compositions.

I have found that N-substituted para-diamino carbocyclic ring compounds are particularly effective and highly active insecticidal agents. These ring compounds are preferably benzenoidal rings, such as N-substituted derivatives of para-diamino benzene, toluene, xylene, naphthalene, etc. In some cases the ring may be an alicyclic ring such as cyclohexane, and more especially a cyclo-olefinic ring such as cyclohexenyl, cyclohexadienyl, etc. The present compounds are derivatives of para-diamino ring compounds wherein at least some and preferably at least two of the hydrogen atoms on the nitrogen atoms of the amino groups are substituted by alkyl, alkenyl, aralkyl, aryl, alicyclic, cyclo-olefinic or heterocyclic radicals, such as for example, methyl, ethyl, propyl, isopropyl, normal butyl, secondary butyl, tertiary butyl, hexyl, iso-octyl, dodecyl, cetyl, stearyl, trimethyl octadecyl, allyl, methallyl, crotyl, methyl vinyl carbinyl, butenyl, pentenyl, hexenyl, propargyl, geranyl, oleyl, cyclopentyl, ethyl cyclopentyls, methallyl cyclopentyls, methyl butyl cyclopentyls, cyclohexyl, allyl cyclohexyls, diallylcyclohexyls, isopropyl cyclohexyls, secondary butyl cyclohexyls, dimethyl cyclohexyls, trimethyl cyclohexyls, endomethylene cyclohexyls, cyclopentenyl, methyl cyclopentenyls, amyl cyclopentenyls, cyclohexenyl, dimethyl cyclohexenyls, trimethyl cyclohexenyls, allyl cyclohexenyls, vinyl cyclohexenyls, phenyl, methallyl phenyl, tolyl, xylyl, vinyl phenyl, butyl phenyls, 4-isobutyl phenyl, naphthyl, methyl naphthyl, crotonyl naphthyl, triallyl naphthyl, anthryl, etc., or heterocyclic radicals, such as pyridyl, sulfolanyl, methyl sulfolanyl, pyrrolyl, thioenyl, furyl, butyl carbothionyl, octyl carbothionyl, etc.

The N-substituted para-diamino ring compounds are especially effective when both hydrogen atoms on one nitrogen atom are replaced, such as preferably, by lower molecular weight (i. e., less than six carbon atoms) aliphatic radicals. For example, p-amino dimethyl aniline has been found to be outstandingly effective in controlling insects such as houseflies. In some instances, it may be highly desirable for both nitrogen atoms to be substituted, such as by alkyl groups, either symmetrically or asymmetrically.

The N-substituted para-diamino carbocyclic ring compounds, either alone or in combination with other active or inactive substances, may be applied to plants, animals, fabrics and the like, by spraying, dusting, pouring, dipping, etc., in the form of concentrated liquids, solutions, suspensions, dusting powders, and the like, containing such concentration of the active principle as is most suited for the particular purpose at hand. They may be applied, for example, in the form of dilute solutions, in a suitable solvent or mixture of solvents, containing, for instance, petroleum distillate, lignite tar oils, paraffin oils, naphthenes, chlorinated hydrocarbons, such as dichloropropane, chlorinated ethers, ketones, such as acetone, fenchyl and bornyl alcohols, mono- and polyhydric alcohols, glycol ethers, or the like or mixtures thereof.

The present compounds may be advantageously used in combination with other insecticides or fungicides such as pyrethrum, derris resins, rotenone, nicotine, lime-sulphur, Bordeaux mixture, copper sulfate, copper carbonates, sulphur, mercury compounds, sodium, calcium and lead arsenates, iron sulfate, phenol, para-dichlorobenzene, unsaturated chlorides, higher unsaturated amides, alkene sulfides, alkyl dithiocarbamates, thiuram sulfides, thiocyanates, thiocyano esters, isothiocyanates, ethylene glycol ether of pinene, butyl mesityl oxide oxalate, polyhalogenated compounds, such as 1,1-diparachlorophenyl 2,2,2-trichloroethane, unsaturated cyclic ketols, such as diisophorone and its homologues, obtained by condensation of lower ketones, such as acetone, methyl ethyl ketone, etc., according to U. S. Patent 2,307,482, and the like.

As will be readily apparent, the most desirable N-substituted para-diamino carbocyclic ring compound and solvent, or solvent mixture, or combination with other active and inactive ingredients, will depend considerably upon the particular use for which the material is intended.

For use in household insecticides, N-substituted para-diamino carbocyclic ring compounds are preferably dissolved in a light hydrocarbon oil such as highly refined, odorless kerosene or kerosene distillate with or without the addition of other insecticides and sprays. Ordinarily from about 1% to 25% and preferably from 2% to 8% of the present toxicants are used in such sprays.

For use in sprays, such as horticultural spray oils, there may be added emulsifying agents, such as partial esters of polyhydric alcohols, e. g., glycerol mono-oleate, polyethylene glycol mono laurate, palmitate, stearate, oleate, etc., various soaps, alkali metal salts of sulfuric acid mono esters and organic sulfuric acids and the like.

The present compounds may also be mixed with or absorbed by finely divided solid materials, such as wood flour, talc, clay, bentonite, sulfur, and carbon black, and used as dusting insecticides.

Modified Peet-Grady tests were made with the N-substituted paradiamino carbocyclic ring compounds of the present invention. The general test is fully described in the 1940 "Blue Book," published by the publisher of "Soap and Sanitary Chemicals" periodical on pages 193 to 197, as the large group method. Briefly, the test as practiced consists of releasing 100 to 150 flies in an air-conditioned case 6 x 6 x 6 feet and spraying them with 6 ml. of insecticide. After 10 minutes exposure the number of flies which are incapacitated or "knocked down" is noted and all flies transferred to a cage and allowed to recuperate in fresh air for 24 hours, when the dead flies are counted. For the purpose of this study the percentages knocked down at 10 minutes and killed at 24 hours were recorded. When a solution of 5 grams/100 ml. of para-amino dimethyl aniline and 5% by vol. of 20:1 pyrethrum extract concentrate in a 50–50 mixture of acetone and odorless kerosene was tested in the above manner, a 10 minute knockdown of 100% and a 24 hour kill of 100% was obtained. A similar solution of 5% vol. of said pyrethrum extract in said mixture usually gives a 24 hour kill of only 30% to 45%.

Besides the control of houseflies (*Musca domestica*), the compositions containing the present N-substituted para-diamino carbocyclic compound may be used for eradicating or controlling various pests, such as insects, e. g., aphids, diabrotica, red spiders, thrips, etc., bacteria and fungi, such as Aspergillus, Penicillium, *Sclerotium rolfsii*, etc., and the like.

I claim as my invention:

1. An insecticidal composition comprising an insecticidal plant extract and a para-diamino carbocyclic ring compound having both hydrogen atoms on at least one of the nitrogen atoms replaced by hydrocarbon radicals.

2. An insecticidal composition comprising an insecticidal plant extract and a para-diamino carbocyclic ring compound having at least one nitrogen atom dialkylated with alkyl radicals of lower molecular weight.

3. An insecticidal composition comprising an insecticidal plant extract and a para-diamino benzene having one nitrogen atom dialkylated with like alkyl radicals of less than 6 carbon atoms.

4. An insecticidal composition comprising an insecticidal plant extract and a para-diamino carbocyclic ring compound having at least one of the hydrogen atoms on at least one of the nitrogen atoms replaced by a hydrocarbon radical.

5. An insecticidal composition comprising pyrethrum and a para-diamino carbocyclic ring compound having at least one of the hydrogen atoms on at least one of the nitrogen atoms replaced by a hydrocarbon radical.

6. An insecticidal composition comprising an insecticidal plant extract, a para-diamino carbocyclic ring compound having at least one of the hydrogen atoms on at least one of the nitrogen atoms replaced by a hydrocarbon radical, and a light hydrocarbon oil.

7. An insecticidal composition comprising pyrethrum, a para-diamino carbocyclic ring compound having at least one of the hydrogen atoms on at least one of the nitrogen atoms replaced by a hydrocarbon radical, and a light hydrocarbon oil.

8. An insecticidal composition comprising pyrethrum and para-amino dimethyl aniline.

9. An insecticidal composition comprising pyrethrum, para-amino dimethyl aniline, and a light hydrocarbon oil.

10. An insecticidal composition comprising an insecticidal plant extract and para-amino dimethyl aniline.

11. The method of combating insects which comprises applying a para-diamino carbocyclic ring compound having at least one of the hydrogen atoms on at least one of the nitrogen atoms replaced by a hydrocarbon radical, to loci for killing insects contacting said loci.

12. The method of combating insects which comprises applying a para-diamino benzene having one nitrogen atom dialkylated with like alkyl radicals of less than 6 carbon atoms, to loci for killing insects contacting said loci.

13. The method of combating insects which comprises applying para-amino dimethyl aniline to loci for killing insects contacting said loci.

STEPHEN C. DORMAN.

REFERENCES CITED

The following references are of record in the file of this patent:

UNITED STATES PATENTS

| Number | Name | Date |
| --- | --- | --- |
| 1,968,341 | Hartman et al. | July 31, 1934 |

OTHER REFERENCES

Schraube and Wu, B. 18, 619 and B. 12, 924–925.
Beilstein, Band XIII, page 72.